United States Patent [19]

Wendt et al.

[11] Patent Number: 4,993,328
[45] Date of Patent: Feb. 19, 1991

[54] TROLLEY ASSEMBLY

[75] Inventors: Bernard J. Wendt, Davisburg; Thomas L. Beno, Farmington Hills, both of Mich.

[73] Assignee: Allor Manufacturing, Inc., Novi, Mich.

[21] Appl. No.: 508,547

[22] Filed: Apr. 10, 1990

Related U.S. Application Data

[63] Continuation of Ser. No. 234,552, Aug. 22, 1988, abandoned.

[51] Int. Cl.⁵ .................................................. A47H 15/00
[52] U.S. Cl. .................................. 105/150; 382/140; 382/482
[58] Field of Search .................... 105/150, 154, 155; 384/139, 140, 481, 482, 484

[56] References Cited

U.S. PATENT DOCUMENTS

| | | | |
|---|---|---|---|
| 1,600,878 | 9/1926 | Hegarty | 105/154 |
| 2,250,167 | 7/1941 | Niles et al. | 105/154 |
| 2,517,652 | 8/1950 | Gaboury | 105/154 |
| 2,584,610 | 2/1952 | Pearson | 105/154 |
| 2,611,326 | 9/1952 | Smallpeice | 105/154 |
| 2,655,392 | 10/1953 | Lighthall | 384/482 |
| 2,861,850 | 11/1958 | Nyblom | 105/154 |
| 2,985,113 | 5/1961 | Cotesworth | 105/154 |
| 3,010,771 | 11/1961 | Cogger | 384/482 |
| 3,071,385 | 1/1963 | Greiner | 384/484 |
| 3,090,628 | 5/1963 | Giulietti | 384/482 |
| 3,588,206 | 6/1971 | Frost | 384/481 |
| 3,602,150 | 8/1971 | Frost et al. | 104/172 S |
| 3,739,424 | 6/1973 | Gonsalves et al. | 16/98 |
| 3,792,912 | 2/1974 | Howe, Jr. et al. | 384/482 |
| 4,384,387 | 5/1983 | Pachuta | 105/510 |
| 4,464,997 | 8/1984 | Dehne | 104/172 S |
| 4,856,916 | 8/1989 | Ito et al. | 384/484 |

FOREIGN PATENT DOCUMENTS

| | | | |
|---|---|---|---|
| 640392 | 7/1950 | United Kingdom | 105/154 |
| 1082612 | 9/1967 | United Kingdom | 384/481 |

Primary Examiner—Andres Kashnikow
Assistant Examiner—Christopher G. Trainor
Attorney, Agent, or Firm—Krass & Young

[57] ABSTRACT

A trolley wheel assembly for use with an overhead conveyor system. The trolley wheel assembly includes a roller comprising a solid generally cylindrical body with a blind bore opening in the outboard face of the roller; a shaft positioned at one end in the blind bore and having a free end projecting out of the bore for connection to a trolley hanger; a bearing positioned in the blind bore and including an inner race press fit on the shaft and an outer race press fit in the blind bore; and a metallic ring seal sealingly engaging at its outer periphery with the outboard annular face of the outer race and at its inner periphery with the outboard annular face of the inner race to preclude the entry of contaminants into the bearing or the escape of lubricants from the bearing. The ring seal has an axially extending outer periphery which is clamped between the outboard annular face of the outer race and a snap ring positioned in a groove in the blind bore, and an axially extending inner portion having a free annular edge which is preloaded against the outboard annular face of the inner race and which gradually wears an annular groove in the inner race so that the seal therebetween improves with usage. A fluoro chlorated lubricant is provided in the bearing so as to avoid carbonizing of the lubricant when the wheel assembly operates in a hostile environment such as a paint spray booth.

13 Claims, 2 Drawing Sheets

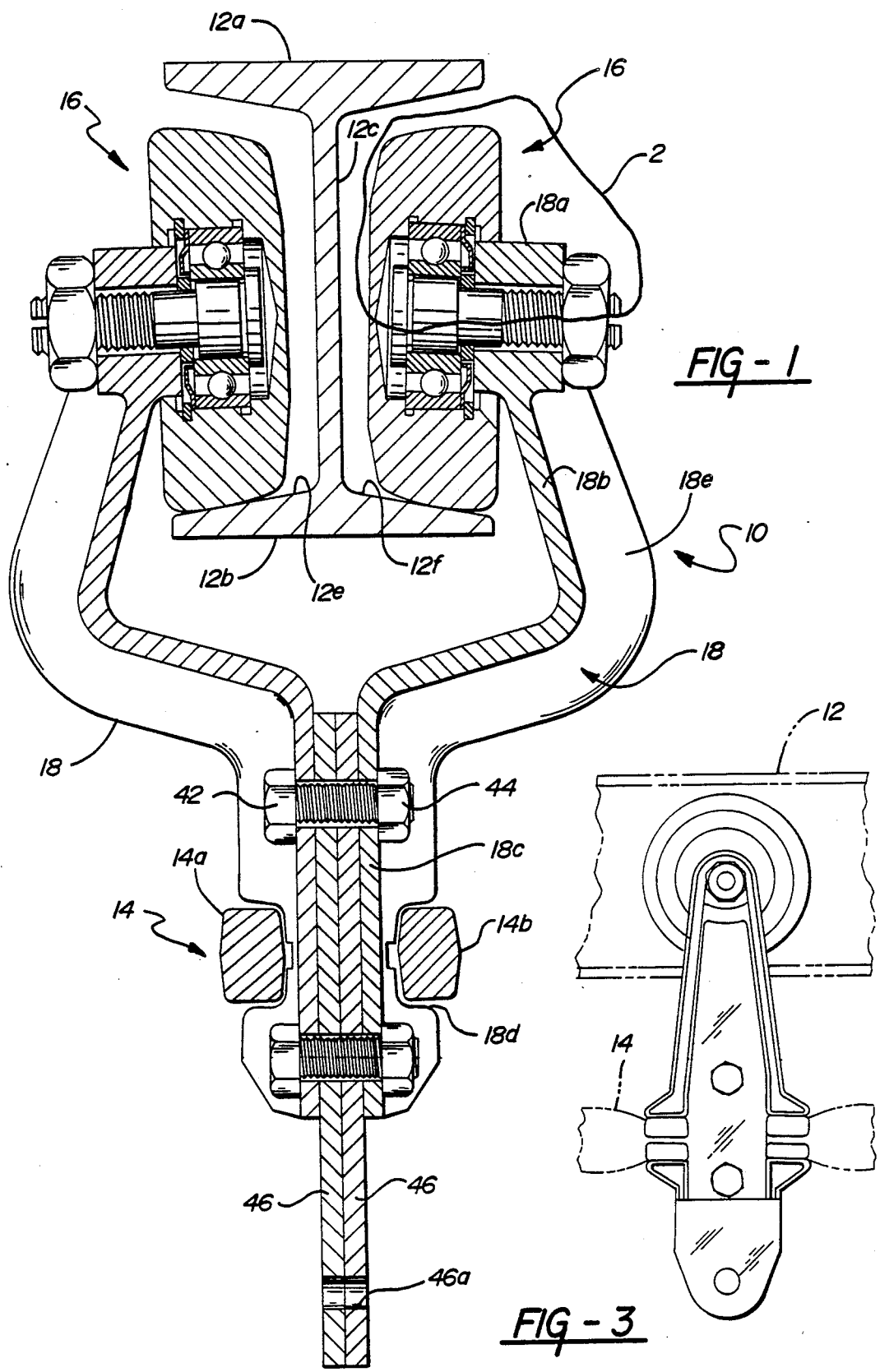

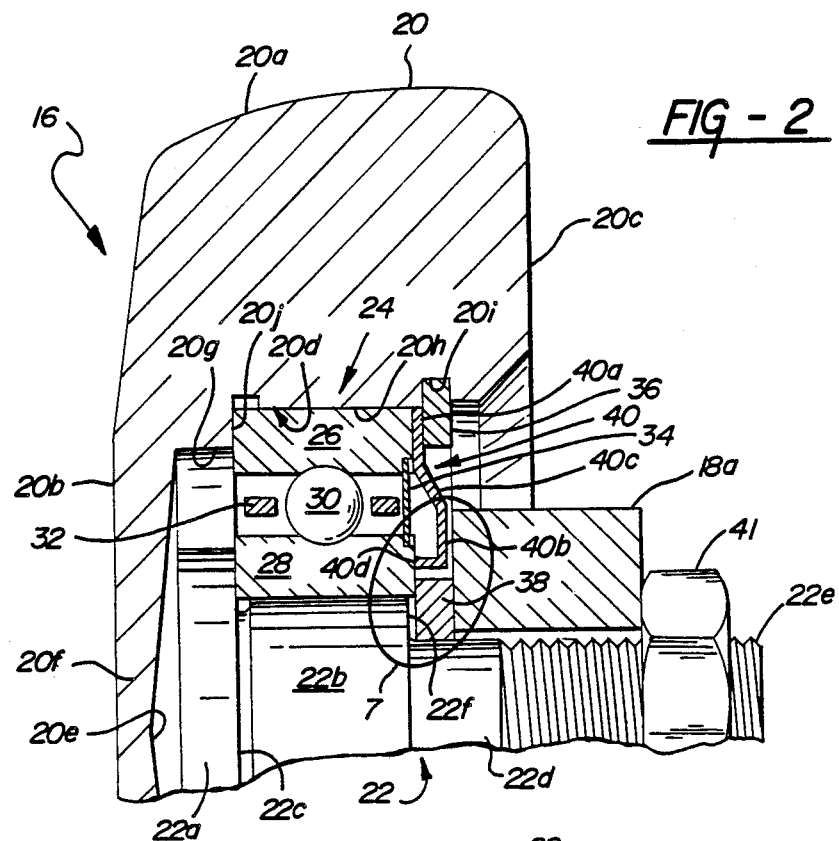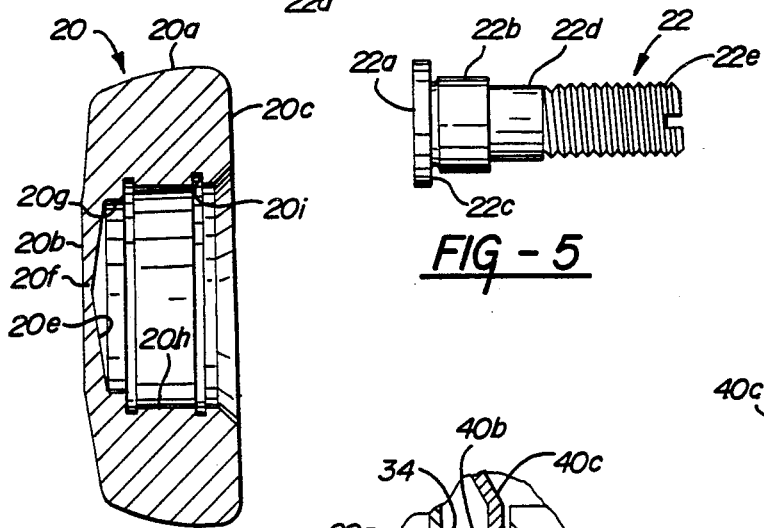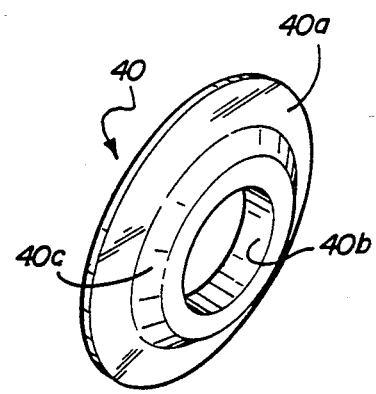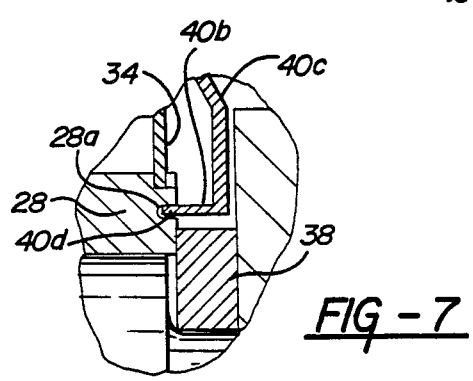

TROLLEY ASSEMBLY

This is a continuation of co-pending application Ser. No. 234,552 filed on Aug. 22, 1988, now abandoned.

BACKGROUND OF THE INVENTION

This invention relates to trolley assemblies. In various manufacturing and warehouse facilities, it is common practice to use overhead tracks for moving suspended loads between spaced points within the facility. The loads are typically carried by trolley assemblies which include rollers at their upper ends rollably guiding on the track and further include hangers carried by the rollers and depending downwardly from the rollers to provide a carrier for the suspended loads. Whereas trolley assemblies of this general type provide an effective means of moving loads from point to point within warehousing or manufacturing facilities, the trolley assemblies tend to be rather high maintenance items and tend to have a relatively short product life. Further, when used in facilities where the surrounding environment is hostile or sensitive, such for example as paint spray booths, the trolley assemblies can have the inadvertent effect of contaminating the atmosphere within the spray booth to the detriment of the painting operation being performed within the spray booth and/or contaminates within the spray booth can enter the trolley assemblies to the detriment of the efficient operation of the trolley assemblies.

SUMMARY OF THE INVENTION

This invention is directed to the provision of an improved trolley assembly.

More specifically, this invention is directed to the provision of an improved trolley assembly requiring less maintenance than prior art assemblies and providing longer product life.

This invention is further directed to the provision of a trolley assembly which includes provision to avoid contamination of the surrounding atmosphere serviced by the trolley assembly.

The invention trolley assembly is adapted for use with a conveyor system employing a fixed overhead track. The invention trolley assembly includes a roller comprising a solid generally cylindrical body including a circumferential surface for rolling engagement with the track of the conveyor system, an outboard side wall, an inboard side wall, and a blind bore opening in the outboard side wall and extending to a location proximate the inboard sidewall but spaced therefrom by a solid body portion of the rollers; a shaft positioned at one end in the blind bore and having a free end projecting out of the blind bore for connection to a trolley hanger; and a bearing positioned in the blind bore in surrounding relation to the one end of the shaft. This arrangement provides a simple and effective roller assembly that is especially adapted for use in a trolley assembly.

According to a further feature of the invention, the trolley assembly further includes sealing means operative to seal the open end of the blind bore of the roller to preclude entry of contaminants into the bore and the escape of lubricant from the bore. This arrangement provides a long wheel assembly life and allows the use of the wheel assembly in critical environments where escape of lubricant from the bearing of the wheel assembly would be detrimental to the work operation being performed in the surrounding environment.

According to a further feature of the invention, the bearing comprises an outer race carried by the roller, an inner race carried by the shaft, and bearing members positioned rollably between the inner and outer races, and the sealing means comprises a ring seal sealingly coacting at its outer periphery with the outer race and sealingly coacting at its inner periphery with the inner race. This sealing arrangement provides an inexpensive and effective means of sealing the bearing so as to preclude the entry of contaminants into the bearing or the escape of lubricants from the bearing.

According to a further feature of the invention, the trolley assembly further includes an annular groove in the roller opening radially inwardly into the blind bore outboard of the bearing races and a retainer ring positioned in the groove; and the radially outer periphery of the ring seal is clamped between the annular inboard face of the retainer ring and the annular outboard face of the outer race. This arrangement provides a convenient means of maintaining the ring seal in sealing position relative to the inner and outer races of the bearing.

According to a further feature of the invention, the trolley assembly further includes a retainer ring positioned on the shaft outboard of the inner race and engaging the radially inner portion of the annular outboard face of the inner race, and the radially inner periphery of the ring seal sealingly engages the radially outer portion of the annular outboard face of the inner race. This specific arrangement provides a convenient and effective packaging for the trolley assembly.

According to a further feature of the invention, the ring seal, in cross section, includes an outer portion extending radially outwardly, an inner portion extending axially, and an intermediate portion extending obliquely between the radial inner end of the outer portion and the axially outboard end of the inner portion; the outer ring seal portion is clamped between the retainer ring and the outer race; and the axial inboard annular edge of the inner ring seal portion sealingly engages the annular outboard face of the inner race. This specific arrangement provides an effective and simple seal as between the ring seal and both the outer and inner races of the bearing.

According to a further feature of the invention, the ring seal is formed of a resilient material and is configured such that the axially inboard annular edge of the inner ring seal portion is preloaded against the annular outboard face of the inner race. This arrangement provides a positive seal as between the ring seal and the inner race and allows the seal to gradually wear a groove in the outboard face of the inner race in which the axial inboard annular edge of the inner ring seal portion rides to provide a seal as between the ring seal and the inner race that improves with usage.

According to a further feature of the invention, a lubricant is provided between the inner and outer races of the bearing in surrounding relation to the bearing members and the lubricant comprises a synthetic fluoro chlorated grease. The use of a fluoro chlorated grease allows the invention trolley wheel assembly to be employed in high temperature applications which would tend to carbonize conventional lubricants and derogate the operation of the wheel assembly.

According to a further feature of the invention, the trolley assembly includes a hanger member; the free end of the shaft is threaded for receipt of a nut; and the hanger member upper end passes the free end of the shaft and is clamped by the nut between the nut and the outboard face of the retainer ring positioned on the shaft. This arrangement provides a simple and effective means of maintaining all of the parts in a positive, tightly clamped relationship.

According to a further feature of the invention, the hanger member upper end extends radially outwardly beyond the radial outer circumference of the shaft retainer ring so that a groove is defined by the inboard face of the hanger member upper end, the radially outer circumference of the retainer ring, and the outboard face of the inner race; and the inner portion of the annular seal is positioned within this groove. This arrangement provides a groove for nesting receipt of the inner end of the annular seal so as to shelter this end of the seal and further facilitate the sealing of the trolley assembly.

BRIEF DESCRIPTION OF THE DRAWING

FIG. 1 is a cross sectional view of a trolley assembly according to the invention;

FIG. 2 is a detail view taken within the circle 2 of FIG. 1;

FIG. 3 is a side elevational view of the trolley assembly seen in FIG. 1;

FIGS. 4, 5 and 6 are detail views of components utilized in the trolley assembly of FIG. 1; and FIG. 7 is a detail view taken within the circle 7 of FIG. 2.

DETAILED DESCRIPTION OF THE PREFERRED EMBODIMENT

The trolley assembly 10 is seen in FIGS. 1 and 3 in association with a conveyor system including an overhead beam 12 and a conveyor chain 14. Beam 12 has an I configuration and includes an upper flange 12a, a lower flange 12b and a central web 12c. Lower flange 12b defines a pair of parallel tracks 12d and 12e disposed on opposite sides of central web 12c.

Trolley assembly 10 includes a pair of identical trolley wheel assemblies 16, and a pair of identical hanger members 18 respectively associated with the wheel assemblies 16.

Each wheel assembly 16 includes a roller or wheel 20, a shaft or pin 22, and a ball bearing 24.

Roller 20 is machined from a steel blank and includes a generally cylindrical, circumferential surface 20a, an inboard side wall 20b, an outboard sidewall 20c, and a blind bore 20d opening in the outboard face 20c and extending to an inboard blind end face 20e proximate inboard side wall 20b but spaced therefrom by a solid body portion 20f of the roller. Blind bore 20d includes a main bore portion 20g, a counterbore portion 20h, and an annular groove 20i.

Shaft 22 is formed of a suitable steel material and includes a head portion 22a, a main body portion 22b separated from head portion 22a by a groove 22c, and a shank portion 22d terminating in a threaded end portion 22e and defining an annular radius shoulder 22f with main body portion 22b.

Ball bearing 24 includes an outer race 26 press fit in counterbore 20h and seating at its inboard annular end face against an annular shoulder 20j defined between bore main body portion 20g and counterbore 20h; an inner race 28 press fit on shaft main body portion 22b with its inboard annular end face seated against shaft head portion 22a, and a plurality of ball bearings 30 positioned rollably between inner and outer races 26, 28 and held in position by a cage 32. Bearing 24 also preferably includes an annular seal member 34 formed of Viton or the like positioned in counterbores in the outboard faces of races 26, 28. Bearing 24, including seal member 34, may for example be of the type available from SKF Corporation of King of Prussia, Pa. as Part No. 6203ZRS.

Bearing 24 is preferably surgically cleaned prior to installation by the use of Freon 13 to purge hydrocarbon contaminants from the bearing whereafter the bearing is preferably filled with a fluoro chlorated grease, such for example as Dupont Krytox. The lubricant fills the space between the races and surrounds the ball bearings 30, is held against outboard migration by the seal 34, and is held against inboard migration by the cohesion of the lubricant and its adhesion to the surrounding races.

Each wheel assembly 16 further includes a split retainer ring 36, a retainer washer 38, and a ring seal 40.

Split retainer ring 36 is positioned in known manner in groove 20i and retainer washer 38 is fitted over the shank portion 22d of shaft 22.

Ring seal 40 is a stamped member and is formed for example of SAE 1060-1080 spring steel. Ring seal 40 includes an outer portion 40a extending radially outwardly, an inner portion 40b extending axially, and an intermediate portion 40c extending obliquely between the radial inner end of outer portion 40a and the axial outboard end of inner portion 40b. Ring seal 40 may for example be of the type available from Ziller and Company of Dusseldorf, West Germany as Nilos Part No. 6303JV.

Each hanger 18 is formed of forged steel and includes an upper hub portion 18a passing the shank portion 22d of the shaft of the associated wheel assembly, an angled intermediate portion 18b, and a lower portion 18c. Lower portions 18c are held together by bolts 42 coacting with nuts 44 with carrier plates 46 sandwiched therebetween and extending downwardly therefrom to define apertures 46a for receipt of a hook member or the like for use in transporting loads utilizing the conveyor assembly.

In the assembled relation of each trolley wheel assembly, shaft 22 is positioned in blind bore 20d with its head portion 22a positioned proximate the end wall 20e of the blind bore and with its free end 22e projecting out of the bore; outer bearing race 26 is press fit in bore portion 20h with its inboard annular face butted against shoulder 20j; inner race 28 is press fit on shaft main body portion 22b with its inboard annular face butted against the shoulder defined by shaft head portion 22a; balls 30 are rollably disposed between races 26 and 28; seal member 34 closes the outboard annular opening between races 26 and 28; a fluoro chlorated grease is positioned between the races in surrounding relation to the balls 30; outer portion 40a of ring seal 40 is clamped between the outboard annular face of race 26 and the inboard annular face of retainer snap ring 36; nut 41 is tightened onto shaft end portion 22e to clamp hanger upper hub portion 18a between the inboard face of the nut and the outboard face of washer 38 and to clamp washer 38 between the inboard face of hanger upper hub portion 18a and the outboard annular face of inner race 28; and the inner axially extending portion 40b of ring seal 40 is positioned in the groove defined by the inboard annular face of hanger upper hub portion 18a, the outer circumferential surface of washer 38, and the inboard annular surface of inner race 28 with the free inboard annular edge 40d of inner portion 40b preloaded against the outboard annular face of inner race 28 to provide a positive annular seal therebetween.

In the assembled relation of the trolley assembly, the rollers of the respective trolley wheel assemblies 16 are rollably disposed on tracks 12e and 12f respectively with hanger portions 18b extending downwardly and then inwardly for clamping connection by bolts 42 and nuts 44 to position carrier plates 46 in a position where they may conveniently engage a load to be conveyed; and the split halves 14a and 14b of a conveyor chain link 14 are positioned in notches 18d in flange portions 18e of hangers 18 so as to embrace and drivingly engage the hanger so that powered movement of the chain in known manner serves to move the trolley assembly 10 along the track 12 to move a load carried by carrier plates 46 from point to point within the associated facility.

The invention trolley assembly will be seen to have many important advantages. Specifically, the use of a roller having a blind bore simplifies the sealing of the roller assembly by providing a solid wall portion of the roller at one end of the roller assembly. Further, the use of a metal seal at the outboard end of the blind bore sealingly coacting with the outboard annular faces of the inner and outer races of the ball bearing provides a positive and long lasting seal for the lubricant contained within the blind bore so as to preclude the entry of contaminants into the blind bore in derogation of the operation of the trolley wheel assembly and preclude the escape of lubricant from the blind bore to contaminate the environment in which the trolley wheel assembly is operating. For example, when the invention trolley assembly is used in a paint spray booth, it is important that the hostile environment of the paint spray booth be prevented from entering and attacking the trolley wheel assembly bearing. It is equally important that the lubricant contained within the bearing of the trolley wheel assembly be precluded from escaping from the trolley wheel assembly to contaminate the atmosphere of the paint booth and derogate the quality of paint finish being achieved within the booth. Note in this regard that even ball bearings equipped with Viton seals such as shown at 34 are unsuitable for use in hostile or delicate environments since the seals 34 break down at a relatively low temperature with consequent loss of lubricant and entry of contaminants into the bearing whereas the ring seal 40 is capable of providing total and complete sealing in even very hostile environments. For example, a typical Viton seal such as seen at 34 will melt or become embrittled at 300° F. with consequent loss of sealing whereas the ring seal 40 maintains an effective seal up to 800° F. Note further that, as best seen in FIG. 7, due to the preloading of the inboard annular edge of inner portion 40b of the ring seal 40 against the outboard annular face of the inner race 28 and due to the fact that the material of the ring seal 40 is as least as hard as the material of the inner race 28, the inner annular edge 40d of the inner portion 40b of the ring seal, over a period of usage, wears a groove 28a in the outboard annular face of the inner range 28 and the inboard annular edge 40d of the ring seal rides in this groove in nesting fashion so that the seal as between the ring seal 40 and the inner race 28 actually becomes more effective with usage of the trolley assembly. Note further that the use of a fluoro chlorated grease in the bearing of the trolley wheel assembly allows the trolley assembly to operate in very high temperature environments which would tend to carbonize conventional lubricants. That is, the invention trolley wheel assembly functions to maintain an effective lubricant seal even in extremely hostile environments and the fluoro chlorated lubricant continues to function satisfactorily even in hostile, high temperature environments. As a result, the invention trolley assembly has an extremely long life as compared to prior art trolley assemblies.

Whereas a preferred embodiment of the invention has been illustrated and described in detail it will be apparent that various changes may be made in the disclosed embodiment without departing from the scope or spirit of the invention.

We claim:

1. A trolley wheel assembly for use with a conveyor system, said wheel assembly comprising:
   (A) a roller comprising a solid generally cylindrical body including a circumferential surface for rolling engagement with a track of the conveyor system, an outboard sidewall, an inboard sidewall, and a blind bore opening in said outboard sidewall and extending to a location proximate said inboard sidewall but spaced therefrom by a solid body portion of said roller defining a blind end face of said bore;
   (B) a shaft positioned in said blind bore and having a free outboard end projecting out of said bore for connection to a trolley hanger and an inboard end;
   (C) means, including a bearing positioned in said blind bore in surrounding relation to said shaft, operative to preclude axial movement of said shaft relative to said roller and maintain said inboard end of said shaft in a position proximate but spaced outboard from said blind end face of said bore, said bearing comprising an outer race carried by said roller, an inner race carried by said shaft and defining an annular space between said inner and outer races, and bearing members positioned rollably between said inner and outer races;
   (D) a ring seal positioned in said blind bore outboard of said bearing members sealingly and contiguously coacting at its outer periphery with an outboard annular face of said outer race and sealingly and contiguously coacting at its inner periphery with an outboard annular face of said inner race; and
   (E) a second annular seal positioned in said blind bore between said bearing members and said ring seal and sealing said annular space.

2. A trolley wheel assembly according to claim 1 wherein:
   (F) said wheel assembly further includes an annular groove in said blind bore outboard of said bearing races and a first retainer ring positioned in said groove; and
   (G) the radially outer periphery of said ring seal is clamped between the annular inboard face of said retainer ring and the annular outboard face of said outer race.

3. A trolley wheel assembly according to claim 2 wherein:
   (H) said wheel assembly further includes a second retainer ring positioned on said shaft outboard of said inner race and engaging a radially inner portion of the annular outboard face of said inner race; and (I) the radially inner periphery of said ring seal sealingly engages a radially outer portion of the annular outboard face of said inner race.

4. A wheel assembly according to claim 3 wherein:
(J) said ring seal, in cross section, includes an outer portion extending radially outwardly, an inner portion extending axially, and an intermediate portion extending obliquely between the radial inner end of said outer portion and the axially outboard end of said inner portion, and said outer ring seal portion is clamped between said first retainer ring and said outer race and an axially inboard annular edge of said inner ring seal portion sealingly engages the annular outboard face of said inner race.

5. A trolley wheel assembly for use with a conveyor system, said wheel assembly comprising:
(A) a roller comprising a solid generally cylindrical body including a circumferential circular surface for rolling engagement with a track of the conveyor system, an outboard sidewall, an inboard sidewall, and a blind bore opening in said outboard sidewall and extending to a location proximate said inboard sidewall but spaced therefrom by a solid body portion of said roller defining a blind end face of said bore;
(B) a shaft positioned in said blind bore and having a free outboard end projecting out of said bore for connection to a trolley hanger and an inboard end positioned and maintained proximate but spaced from said blind end face;
(C) a ball bearing positioned in said blind bore in surrounding relation to said inboard end of said shaft and including inner and outer races defining an annular space therebetween, ball members rollably positioned in said annular space between said inner and outer races, and a lubricant between said rollers and surrounding said balls;
(D) a ring seal positioned in said blind bore around said shaft outboard of said ball members and sealingly and contiguously engaging annular outboard faces of said inner and outer races to preclude entry of contaminents into said bearing and escape of lubricant from said bearing; and
(E) a second annular seal positioned in said blind bore between said ball members and said ring seal and sealing said annular space to further preclude entry of contaminants into said bearing and escape of lubricant from said bearing.

6. A trolley wheel assembly according to claim 5 wherein:
(F) said lubricant comprises a synthetic fluoro chlorated grease.

7. A trolley assembly for use with a conveyor system, said assembly comprising:
(A) a roller comprising a solid, generally cylindrical body including a circular circumferential surface for rolling engagement with a track of the conveyor system, and outboard sidewall, an inboard sidewall, and a blind bore opening in said outboard side wall and extending to a location proximate said inboard sidewall but spaced therefrom by a solid body portion of said roller defining a blind end face of said bore;
(B) a shaft having a head portion at one end thereof positioned with said one end in said blind bore proximate to but spaced from said blind end face and having a free end projecting out of said bore;
(C) a bearing positioned in said blind bore in surrounding relation to said one end of said shaft and including an inner race carried by said shaft with its inboard annular end face seated against said shaft head portion, an outer race positioned in said bore and defining an annular space with said inner race, and bearing members positioned rollably between said races;
(D) an annular ring seal positioned in said blind bore around said shaft outboard of said bearing members and sealingly and contiguously engaging annular outboard faces of said inner and outer races to preclude entry of contaminants into said blind bore and escape of lubricant from said blind bore;
(E) a second annular seal positioned in said blind bore between said bearing members and said ring seal and sealing said annular space to further preclude entry of contaminants into said blind bore and escape of lubricant from said blind bore; and
(F) a hanger member secured at its upper end to said free end of said shaft and extending downwardly therefrom to define a carrier portion for carrying articles to be conveyed by the conveyor system.

8. A trolley assembly according to claim 7 wherein:
(G) said trolley assembly further includes an annular groove in said blind bore outboard of said bearing races and a first retainer ring in said groove; and
(H) the radially outer periphery of said annular seal is clamped between the annular inboard face of said retainer ring and the annular outboard face of said outer race.

9. A trolley assembly according to claim 8 wherein:
(I) said trolley assembly further includes a second retainer ring positioned on said shaft outboard of said inner race and engaging a radially inner portion of the annular outboard face of said inner race; and
(J) the radially inner periphery of said annular ring seal sealingly engages a radially outer portion of the annular outboard face of said inner race.

10. A trolley assembly according to claim 9 wherein:
(K) said annular ring seal, in cross section, includes an outer portion extending radially outwardly, an inner portion extending axially, and an intermediate portion extending obliquely between the radially inner end of said outer portion and the axial outboard end of said inner portion;
(L) said outer annular seal portion is clamped between said first retainer ring and said outer race; and
(M) an axially inboard annular edge of said inner annular seal portion sealingly engages the annular outboard face of said inner race.

11. A trolley wheel assembly according to claim 10 wherein:
(N) said ring seal is formed of a resilient material and is configured such that said axially inboard annular edge of said inner ring seal portion is preloaded against said annular outboard face of said inner race.

12. A trolley assembly according to claim 11 wherein:
(O) said free end of said shaft is threaded for receipt of a nut;
(P) said hanger member upper end passes said free end of said shaft and is clamped by said nut between said nut and the outboard face of said retainer ring.

13. A trolley assembly according to claim 12 wherein:

(Q) said hanger member upper end extends radially outwardly beyond the radially outer circumference of said first retainer ring so that a space is defined by the inboard face of said hanger member upper end, the radially outer circumference of said retainer ring, and the outboard face of said inner race; and (R) said inner portion of said annular ring seal is positioned within said space.

* * * * *